US011023103B2

(12) United States Patent
Satterfield et al.

(10) Patent No.: US 11,023,103 B2
(45) Date of Patent: *Jun. 1, 2021

(54) USER INTERFACE FOR DISPLAYING SELECTABLE SOFTWARE FUNCTIONALITY CONTROLS THAT ARE RELEVANT TO A SELECTED OBJECT

(71) Applicant: Microsoft Technology Licensing, LLC, Redmond, WA (US)

(72) Inventors: Jesse Clay Satterfield, Seattle, WA (US); Aaron M. Butcher, Duvall, WA (US); David A. Morton, Redmond, WA (US); Jensen M. Harris, Kirkland, WA (US); Justin Denney, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/825,044

(22) Filed: Mar. 20, 2020

(65) Prior Publication Data

US 2020/0285356 A1 Sep. 10, 2020

Related U.S. Application Data

(63) Continuation of application No. 15/631,842, filed on Jun. 23, 2017, now Pat. No. 10,635,266, which is a
(Continued)

(51) Int. Cl.
*G06F 3/048* (2013.01)
*G06F 3/0482* (2013.01)
(Continued)

(52) U.S. Cl.
CPC .......... *G06F 3/0482* (2013.01); *G06F 3/0481* (2013.01); *G06F 3/0483* (2013.01)

(58) Field of Classification Search
CPC .. G06F 3/0481; G06F 3/04842; G06F 40/177; G06F 3/0482; G06F 3/04817; G06F 16/289; G06F 8/34; G06F 8/38
See application file for complete search history.

(56) References Cited

U.S. PATENT DOCUMENTS 5,999,730 A * 12/1999 Lewis ................... G06F 1/3203
717/109
6,384,849 B1 * 5/2002 Morcos .................. G06F 9/451
715/810
(Continued)

OTHER PUBLICATIONS

"Non Final Office Action Issued in U.S. Appl. No. 15/605,004", dated Jan. 24, 2020, 15 Pages.
(Continued)

*Primary Examiner* — Linh K Pham

(57) ABSTRACT

An improved user interface is provided for displaying selectable software functionality controls that are relevant to a selected object and that remain visibly available for use while the selected object is being edited. Upon selection of a particular object for editing, functionality available for editing the object is presented in a ribbon-shaped user interface above the software application workspace to allow the user ready and efficient access to functionality needed for editing the selected object. The display of relevant functionality controls is persisted until the user dismisses the display, selects another top-level functionality control or selects another object for editing.

20 Claims, 15 Drawing Sheets

Related U.S. Application Data continuation of application No. 14/032,094, filed on Sep. 19, 2013, now Pat. No. 9,690,450, which is a continuation of application No. 13/615,668, filed on Sep. 14, 2012, now Pat. No. 9,690,448, which is a continuation of application No. 12/725,605, filed on Mar. 17, 2010, now abandoned, which is a continuation of application No. 10/955,941, filed on Sep. 30, 2004, now Pat. No. 7,703,036.

(60) Provisional application No. 60/601,815, filed on Aug. 16, 2004.

(51) Int. Cl.
*G06F 3/0481* (2013.01)
*G06F 3/0483* (2013.01)

(56) References Cited

U.S. PATENT DOCUMENTS

| | | | |
|---|---|---|---|
| 7,595,722 | B2 | 9/2009 | Heimermann et al. |
| 7,624,339 | B1 | 11/2009 | Engel et al. |
| 10,248,687 | B2 | 4/2019 | Hartwell et al. |
| 10,437,431 | B2 | 10/2019 | Harris et al. |
| 2002/0099777 | A1* | 7/2002 | Gupta .............. G06Q 10/107 709/206 |
| 2003/0048302 | A1* | 3/2003 | Quan, Jr. .............. G06F 9/451 715/764 |
| 2003/0090528 | A1 | 5/2003 | Masuda et al. |
| 2003/0098891 | A1* | 5/2003 | Molander ............ G06F 3/0482 715/841 |
| 2004/0027473 | A1 | 2/2004 | Suzuki |
| 2004/0268259 | A1* | 12/2004 | Rockey .................. G06F 9/451 715/708 |
| 2015/0363049 | A1* | 12/2015 | Sadouski .............. G06F 3/0482 345/173 |
| 2020/0081594 | A1 | 3/2020 | Harris et al. |

OTHER PUBLICATIONS

"Examiner's Decision of Final Refusal Issued in Indian Patent Application No. 05584/CHENP/2010", dated Jan. 24, 2020, 5 Pages.

"Examiner's Decision of Final Refusal Issued in Indian Patent Application No. 01489/DELNP/2008", dated Jan. 30, 2020, 7 Pages.

"Non Final Office Action Issued in U.S. Appl. No. 16/545,836", dated Apr. 29, 2020, 19 Pages.

"Non Final Office Action Issued in U.S. Appl. No. 16/289,093", dated May 1, 2020, 17 Pages.

"Final Office Action Issued in U.S. Appl. No. 15/605,004", dated Jul. 27, 2020, 17 Pages.

"Office Action Issued in Brazilian Patent Application No. PI0712171-7", dated Jul. 22, 2020, 5 Pages.

"Final Office Action Issued in U.S. Appl. No. 16/545,836", dated Dec. 8, 2020, 22 Pages.

"Notice of Allowance Issued in U.S. Appl. No. 16/545,836", dated Feb. 23, 2021, 9 Pages.

* cited by examiner

USER INTERFACE FOR DISPLAYING SELECTABLE SOFTWARE FUNCTIONALITY CONTROLS THAT ARE RELEVANT TO A SELECTED OBJECT

RELATED APPLICATIONS

This application is a continuation of U.S. patent application Ser. No. 15/631,842, now U.S. Pat. No. 10,635,266, titled "User Interface For Displaying Selectable Software Functionality Controls That Are Relevant To A Selected Object" filed Jun. 23, 2017, which is a continuation of U.S. patent application Ser. No. 14/032,094, now U.S. Pat. No. 9,690,450, titled "Improved User Interface for Displaying Selectable Software Functionality Controls that are Relevant to a Selected Object" filed Sep. 19, 2013, which is a continuation of U.S. patent application Ser. No. 13/615,668, now U.S. Pat. No. 9,690,448, titled "User Interface for Displaying Selectable Software Functionality Controls that are Relevant to a Selected Object" filed on Sep. 14, 2012, which is a continuation of U.S. patent application Ser. No. 12/725,605, now abandoned, titled "User Interface for Displaying Selectable Software Functionality Controls that are Relevant to a Selected Object" filed Mar. 17, 2010, which is a continuation of U.S. application Ser. No. 10/955,941, now U.S. Pat. No. 7,703,036, titled "An Improved User Interface for Displaying Selectable Software Functionality Controls that are relevant to a Selected Object" filed Sep. 30, 2004, which claims priority to U.S. Provisional Application No. 60/601,815 titled "Improved User Interfaces for Computer Software Applications" filed Aug. 16, 2004, which are incorporated herein by their reference.

FIELD OF THE INVENTION

The present invention generally relates to software application user interfaces. More particularly, the present invention relates to an improved user interface for displaying selectable software controls that are relevant to a selected object.

BACKGROUND

With the advent of the computer age, computer and software users have grown accustomed to user-friendly software applications that help them write, calculate, organize, prepare presentations, send and receive electronic mail, make music, and the like. For example, modern electronic word processing applications allow users to prepare a variety of useful documents. Modern spreadsheet applications allow users to enter, manipulate, and organize data. Modern electronic slide presentation applications allow users to create a variety of slide presentations containing text, pictures, data or other useful objects.

To assist users to locate and utilize functionality of a given software application, a user interface containing a plurality of generic functionality controls is typically provided along an upper, lower or side edge of a displayed workspace in which the user may enter, copy, manipulate and format text or data. Such functionality controls often include selectable buttons with such names as "file," "edit," "view," "insert," "format," and the like. Typically, selection of one of these top-level functionality buttons, for example "format," causes a drop-down menu to be deployed to expose one or more selectable functionality controls associated with the top-level functionality, for example "font" under a top-level functionality of "format."

After a user selects a desired functionality control, or if the user moves the mouse cursor to a different location, the drop-down menu typically disappears. If the user determines that functionality of the first drop-down menu was the desired functionality, the user must remember which top-level functionality was selected, reselect that functionality and then find the desired functionality control all over again. Accordingly, in order to use the functionality of a given software application, the user must know the desired functionality is available under one of the selectable buttons, or the user must select different top-level functionalities until the desired specific functionality is located.

This is particularly cumbersome when the user desires to apply many available functionalities to a given object type. For example, if the user desires to edit a picture object imbedded in a text document, according to prior methods and systems, the user must find functionality in a drop-down menu associated with editing the picture object. After application of any given functionality, the drop-down menu associated with editing the selected object, e.g., picture object, typically disappears. When the user desires to make a second or subsequent edit to the object, the user must once again find the correct top-level functionality control, deploy a menu of available functionalities, and find the desired particular functionality. Such a method of searching for desired functionality is cumbersome and time-consuming, particularly for less-experienced users, and when new functionality is added by developers of the software application, the new functionality may never be utilized unless the user is somehow educated as to its existence.

Accordingly, there is a need in the art for an improved user interface for displaying selectable software functionality controls that are relevant to a selected object and that remain visibly available for use while the object is being edited. It is with respect to these and other considerations that the present invention has been made.

SUMMARY

Embodiments of the present invention solve the above and other problems by providing an improved user interface for displaying selectable software functionality controls that are relevant to a selected object and that remain visibly available for use while the selected object is being edited. Generally, aspects of the present invention provide for presenting selectable functionality controls associated with a given top-level functionality upon selection of a given object for editing. Upon selection of a particular object for editing, functionality available for editing the object is presented in a ribbon-shaped user interface above the software application workspace to allow the user ready and efficient access to functionality needed for editing the selected object. The display of relevant functionality controls is persisted until the user dismisses the display, selects another top-level functionality control or selects another object for editing.

According to an aspect of the invention, methods and systems provide functionality from a software application that is relevant to an edited object via an improved user interface. A plurality of functionalities available from a given software application is provided. Upon receiving an indication of a selection of an object for editing via the software application, one or more selectable controls representing a subset of the plurality of functionalities is displayed in a ribbon-shaped user interface whereby the subset of the plurality of functionalities is relevant to and allows for editing the selected object. The subset of the plurality of functionalities is persisted in the user interface until an indication is received of the selection of a different object for editing or the selection of a different functionality associated with a different subset of the plurality of functionalities.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention as claimed.

DETAILED DESCRIPTION

As briefly described above, embodiments of the present invention are directed to an improved user interface for displaying selectable functionality controls that are relevant to a selected object and that remain visibly available for use while the selected object is being edited. In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents.

Figure 1:
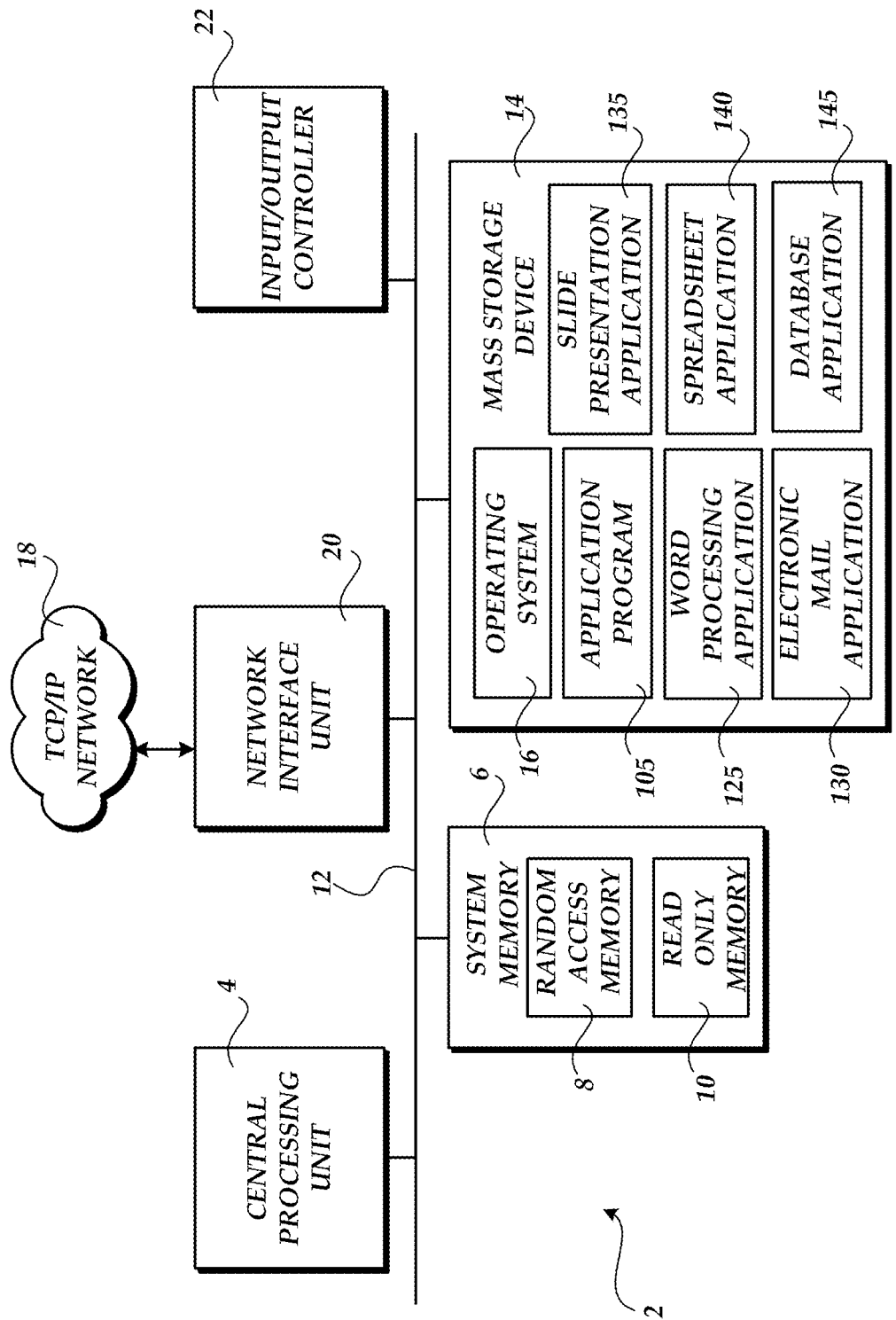
FIG. 1 is a block diagram showing the architecture of a personal computer that provides an illustrative operating environment for embodiments of the present invention.

Referring now to the drawings, in which like numerals represent like elements through the several figures, aspects of the present invention and the exemplary operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for a personal computer 2 for practicing the various embodiments of the invention will be described. The computer architecture shown in FIG. 1 illustrates a conventional personal computer, including a central processing unit 4 ("CPU"), a system memory 6, including a random access memory 8 ("RAM") and a read-only memory ("ROM") 10, and a system bus 12 that couples the memory to the CPU 4. A basic input/output system containing the basic routines that help to transfer information between elements within the computer, such as during startup, is stored in the ROM 10. The personal computer 2 further includes a mass storage device 14 for storing an operating system 16, application programs, such as the application program 205, and data.

The mass storage device 14 is connected to the CPU 4 through a mass storage controller (not shown) connected to the bus 12. The mass storage device 14 and its associated computer-readable media, provide non-volatile storage for the personal computer 2. Although the description of computer-readable media contained herein refers to a mass storage device, such as a hard disk or CD-ROM drive, it should be appreciated by those skilled in the art that computer-readable media can be any available media that can be accessed by the personal computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the personal computer 2 may operate in a networked environment using logical connections to remote computers through a TCP/IP network 18, such as the Internet. The personal computer 2 may connect to the TCP/IP network 18 through a network interface unit 20 connected to the bus 12. It should be appreciated that the network interface unit 20 may also be utilized to connect to other types of networks and remote computer systems. The personal computer 2 may also include an input/output controller 22 for receiving and processing input from a number of devices, including a keyboard or mouse (not shown). Similarly, an input/output controller 22 may provide output to a display screen, a printer, or other type of output device.

As mentioned briefly above, a number of program modules and data files may be stored in the mass storage device 14 and RAM 8 of the personal computer 2, including an operating system 16 suitable for controlling the operation of a networked personal computer, such as the WINDOWS operating systems from Microsoft Corporation of Redmond, Wash. The mass storage device 14 and RAM 8 may also store one or more application programs. In particular, the mass storage device 14 and RAM 8 may store an application program 105 for providing a variety of functionalities to a user. For instance, the application program 105 may comprise many types of programs such as a word processing application, a spreadsheet application, a desktop publishing application, and the like. According to an embodiment of the present invention, the application program 105 comprises a multiple functionality software application for providing word processing functionality, slide presentation functionality, spreadsheet functionality, database functionality and the like. Some of the individual program modules comprising the multiple functionality application 105 include a word processing application 125, a slide presentation application 135, a spreadsheet application 140 and a database application 145. An example of such a multiple functionality application 105 is OFFICE manufactured by Microsoft Corporation. Other software applications illustrated in FIG. 1 include an electronic mail application 130.

Figure 2:
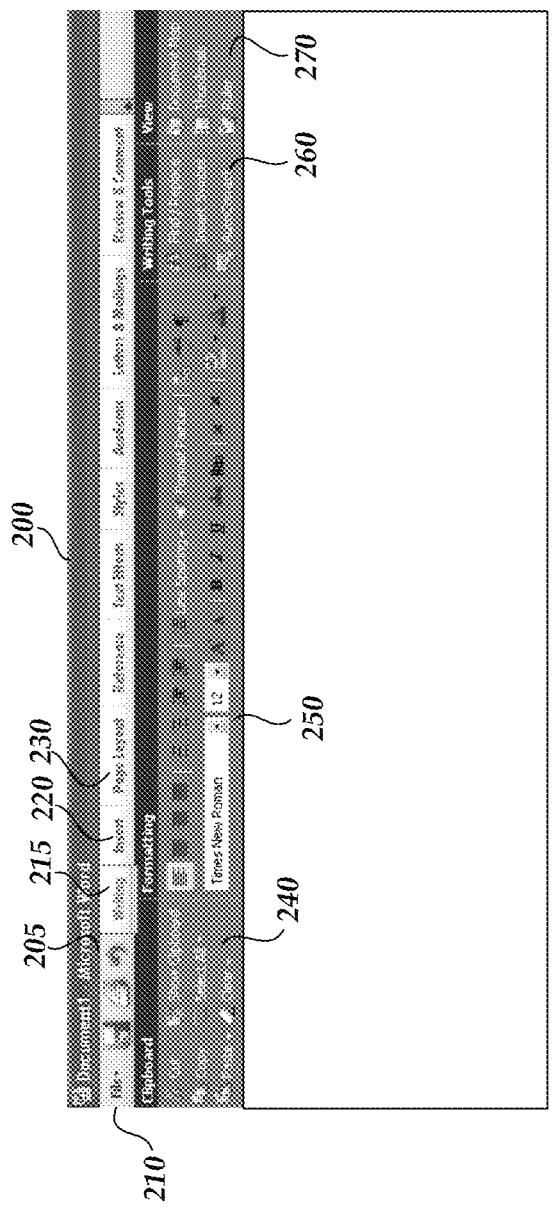
FIG. 2 is an illustration of a computer screen display showing a ribbon-shaped user interface for displaying task-based top-level functionality tabs and for displaying a plurality of functionalities available under a selected top-level functionality tab.

FIG. 2 is an illustration of a computer screen display showing a ribbon-shaped user interface for displaying task-based top-level functionality tabs and for displaying a plurality of functionalities available under a selected top-level functionality tab. As briefly described above, the improved user interface of the present invention includes a ribbon-shaped user interface for displaying selectable controls associated with task-based functionality available under a given software application, such as the software application 105 illustrated in FIG. 1. A first section 210 of the user interface 200 includes generic selectable controls for functionality not associated with a particular task, such as word processing versus spreadsheet data analysis. For example, the section 210 includes selectable controls for general file commands such as "file open," "file save" and "print." According to one embodiment of the present invention, the selectable controls included in the first section 210 are controls that may be utilized by a variety of software applications comprising a multiple functionality application 105. That is, the selectable controls included in the first section 210 may be controls that are generally found and used across a number of different software applications.

Selectable controls included in the first section 210 may be utilized for all such applications comprising such a multiple functionality application, but other selectable controls presented in the user interface 200 described below, may be tailored to particular tasks which may be performed by particular software applications comprising the multiple functionality application. On the other hand, it should be appreciated that the user interface 200 described herein may be utilized for a single software application such as a word processing application 125, a slide presentation application 135, a spreadsheet application 140, a database application 145, or any other software application which may utilize a user interface for allowing users to apply functionality of the associated application.

Referring still to FIG. 2, adjacent to the first section 210 of the user interface 200 is a task-based tab section. The tab section includes selectable tabs associated with task-based functionality provided by a given software application. For purposes of example, the task-based tabs illustrated in FIG. 2 are associated with tasks that may be performed using a word processing application 125. For example, a "Writing" tab 215 is associated with functionality that may be utilized for performing writing tasks. An "Insert" tab 220 is associated with functionality associated with performing insert operations or tasks. A "Page Layout" tab 230 is associated with functionality provided by the associated application for performing or editing page layout attributes of a given document.

As should be appreciated, many other task-based tabs or selectable controls may be added to the tab section of the user interface for calling functionality associated with other tasks. For example, task tabs may be added for text effects, document styles, review and comment, and the like. And, as described above, the user interface 200 may be utilized for a variety of different software applications. For example, if the user interface 200 is utilized for a slide presentation application, tabs contained in the tab section may include such tabs as "Create Slides," "Insert," "Format," "Drawing," "Effects," and the like associated with a variety of tasks that may be performed by a slide presentation application. Similarly, tabs that may be utilized in the tab section of the user interface 200 for a spreadsheet application 140 may include such tabs as "Data" or "Data Entry," "Lists," "Pivot Tables," "Analysis," "Formulas," "Pages and Printing," and the like associated with tasks that may be performed using a spreadsheet application.

Immediately beneath the generic controls section 210 and the task-based tab section is a selectable functionality control section for displaying selectable functionality controls associated with a selected tab 215, 220, 230 from the task-based tab section. According to embodiments of the present invention, when a particular tab, such as the "Writing" tab 215 is selected, selectable functionality available from the associated software application for performing the selected task, for example a writing task, is displayed in logical groupings. For example, referring to FIG. 2, a first logical grouping 240 is displayed under a heading "Clipboard." According to embodiments of the present invention, the clipboard section 240 includes selectable functionality controls logically grouped together and associated with clipboard actions underneath the general task of writing. For example, the clipboard section 240 may include such selectable controls as a cut control, a copy control, a paste control, a select all control, etc. Adjacent to the clipboard section 240, a second logical grouping 250 is presented under the heading "Formatting."

Selectable controls presented in the "Formatting" section 250 may include such selectable controls as text justification, text type, font size, line spacing, boldface, italics, underline, etc. Accordingly, functionalities associated with formatting operations are logically grouped together underneath the overall task of "Writing." A third logical grouping 260 is presented under the heading "Writing Tools." The writing tools section 260 includes such writing tools as find/replace, autocorrect, etc. According to embodiments of the present invention, upon selection of a different task-based tab from the tab section, a different set of selectable functionality controls in different logical groupings is presented in the user interface 200 associated with the selected task-based tab. For example, if the "Insert" task tab 220 is selected, the selectable functionality controls presented in the user interface 200 are changed from those illustrated in FIG. 2 to include selectable functionality controls associated with the insert task. For detailed information regarding the user interface 200, illustrated in FIG. 2, see U.S. patent application Ser. No. 10/955,967, entitled "Command User Interface for Displaying Selectable Software Functionality Controls," which is incorporated herein by reference as if fully set out herein.

Figure 3:
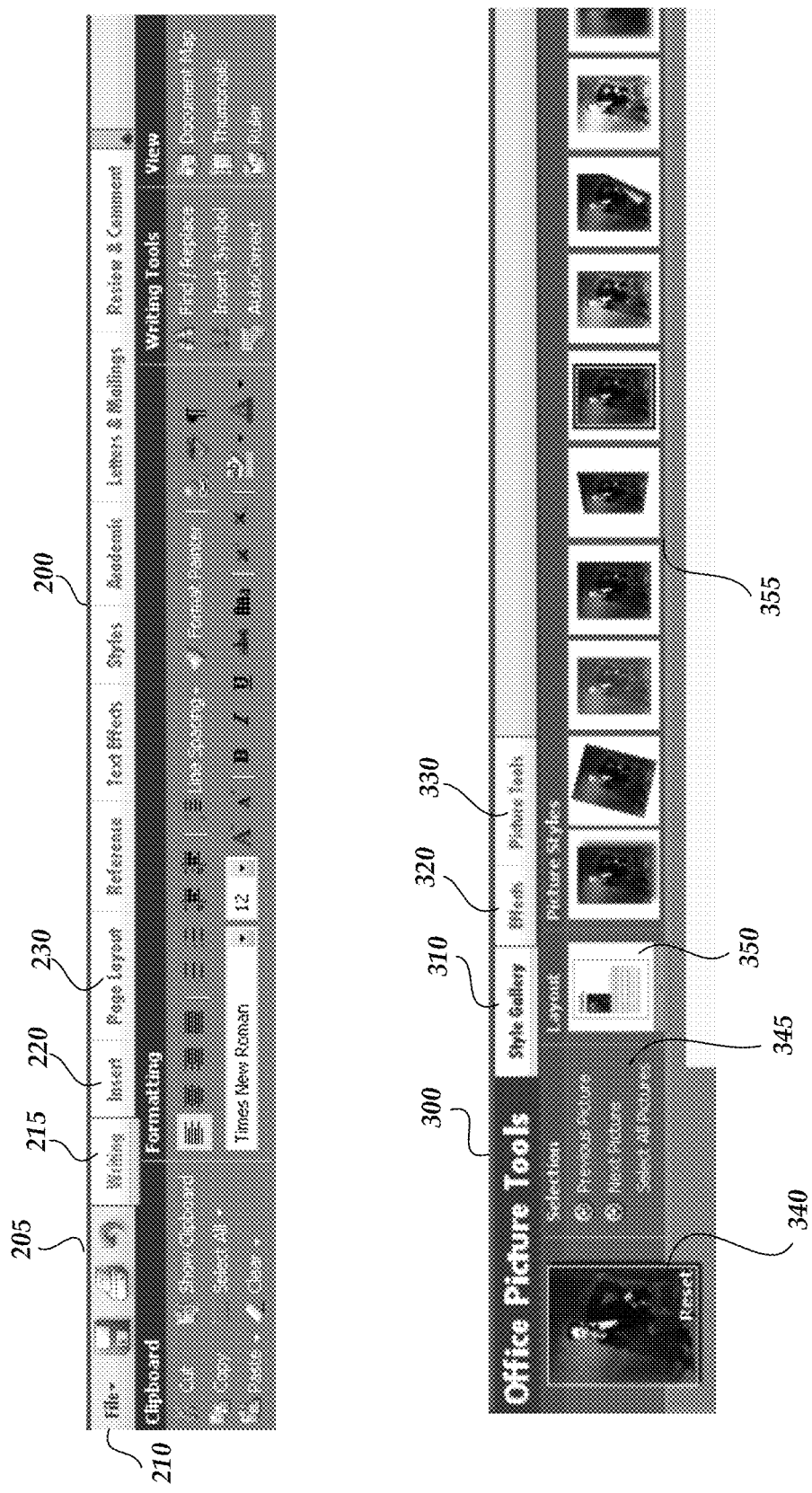
FIG. 3 illustrates a computer screen display showing a ribbon-shaped user interface in which is disposed selectable functionality controls relevant to and associated with the editing of a selected object.

FIGS. 3 through 10 illustrate aspects of a first embodiment of the present invention. FIG. 3 illustrates a computer screen display showing a ribbon-shaped user interface in which is disposed selectable functionality controls relevant to and associated with the editing of a selected object. According to the embodiment illustrated in FIGS. 3-10, of the present invention, when a portion of a document or a particular object is selected for editing, such as a text object, picture object, spreadsheet object, or the like, the user interface illustrated in FIG. 2 is temporarily replaced with a user interface, as illustrated in FIG. 3, which contains selectable functionality controls particularly associated with editing the selected object. For example, if a picture object embedded in a text file is selected for editing, the task-based functionality tabs and any associated logical groupings of individual selectable functionality controls, as described above with reference to FIG. 2, are replaced with one or more task-based functionality tabs and associated logical groupings of selectable functionality controls that are particular to editing the selected object.

For example, referring to FIG. 3, if a picture object embedded in a text file or other document is selected for editing by the user, the ribbon-shaped user interface 300 replaces the ribbon-shaped user interface 200 so that the user is provided with task-based tabs 310, 320, 330 particular to editing the selected picture object. Similar to the description of the user interface 200 described above, upon selection of one of the task-based tabs 310, 320, 330, the portion of the user interface 300 disposed beneath the tabs is populated with individual or logical groupings of selectable functionality controls for applying functionality available under the selected task-based tab to the selected object. For example, referring to the user interface 300, selection of a "Style Gallery" tab 310 causes the presentation of a "Layout" section 350 and a "Picture Styles" section 355. In addition, a "Selection" section 345 is provided for allowing the user to select between multiple picture objects, for example, for application of any selected functionality. If the user applies a given functionality to the selected object, but is not satisfied with the result of the functionality application, a reset button 340 is provided for allowing the user to reset the selected object back to its condition prior to applying the selected functionality. Selection of one of the other task-based tabs, such as the "Effects" tab 320 or the "Picture Tools" tab 330, will cause a different set of selectable functionality controls to be displayed in the lower portion of the user interface 300 associated with the selected task-based tab.

Referring to the example functionality controls illustrated in the user interface 300, in the "Picture Styles" section 355, a plurality of images are provided for showing a user how a selected object would be displayed if a particular combination of formatting options or picture styles is applied to the object. According to embodiments of the present invention, selection of one or more of the images may cause all commands necessary for formatting or stylizing the selected object in a manner consistent with the selected image from the user interface 300. That is, upon selecting a desired image in the "Picture Styles" section 355, the selected object in the user's document is automatically formatted or stylized accordingly. The "Layout" section 350 is representative of a functionality controls section which may have one or more images or potential layout styles or schemes than may be displayed in the user interface 300. Accordingly, as illustrated and described below with reference to FIG. 6, selection of the "Layout" section 350 may cause a drop-down menu or drop-across menu to be displayed providing a user with a variety of different layout options that may be applied to the selected object.

As should be understood by those skilled in the art, the example task-based tabs and individual functionality controls illustrated in the user interface 300 are for purposes of example only and are in no way limiting of the variety of object-specific functionalities that may be provided in the user interface 300. According to embodiments of the present invention, by replacing the normal functionality offerings of the user interface 200 with functionality particular to the selected object, the user experience is one of being immersed in the functionality available to the user for editing the selected object.

If insufficient space is available in the user interface 300 for displaying all logical groupings of functionality controls associated with a given task-based tab, a determination may be made at application run time as to any logical groupings that must be collapsed or closed until the associated task-based tab is selected. Similarly, if the user manually reduces the size of the user interface 300, a determination is made as to the available space for displaying selectable functionality control sections, and certain selectable functionality control sections are collapsed as required. As should be appreciated, a determination may be made as to the order of collapsing selectable functionality control sections such that a criteria, such as "most used" or "most recently used" may be used for determining which selectable functionality control sections are displayed and which sections are collapsed as the available space in the user interface is decreased.

According to an alternate embodiment, if the user interface 300 lacks sufficient space to display all logical groupings of functionality controls associated with a given task-based tab, the size of the display of individual logical groupings is reduced to allow space for the display of all associated logical groupings. According to one aspect of this embodiment, different sizes of groupings displays, for example small, medium and large, may be defined. At display time, a determination may be made as to the available space. At a starting point, the largest size for each applicable logical grouping display is presented. As required, the display size is reduced (i.e., large to medium to small) for each logical grouping until each grouping fits in the available space. In addition, for smaller logical grouping display layouts, text labels may be shortened or eliminated and the layout of individual selectable controls contained in given groupings may be rearranged to allow for more efficient use of space.

Figure 4:
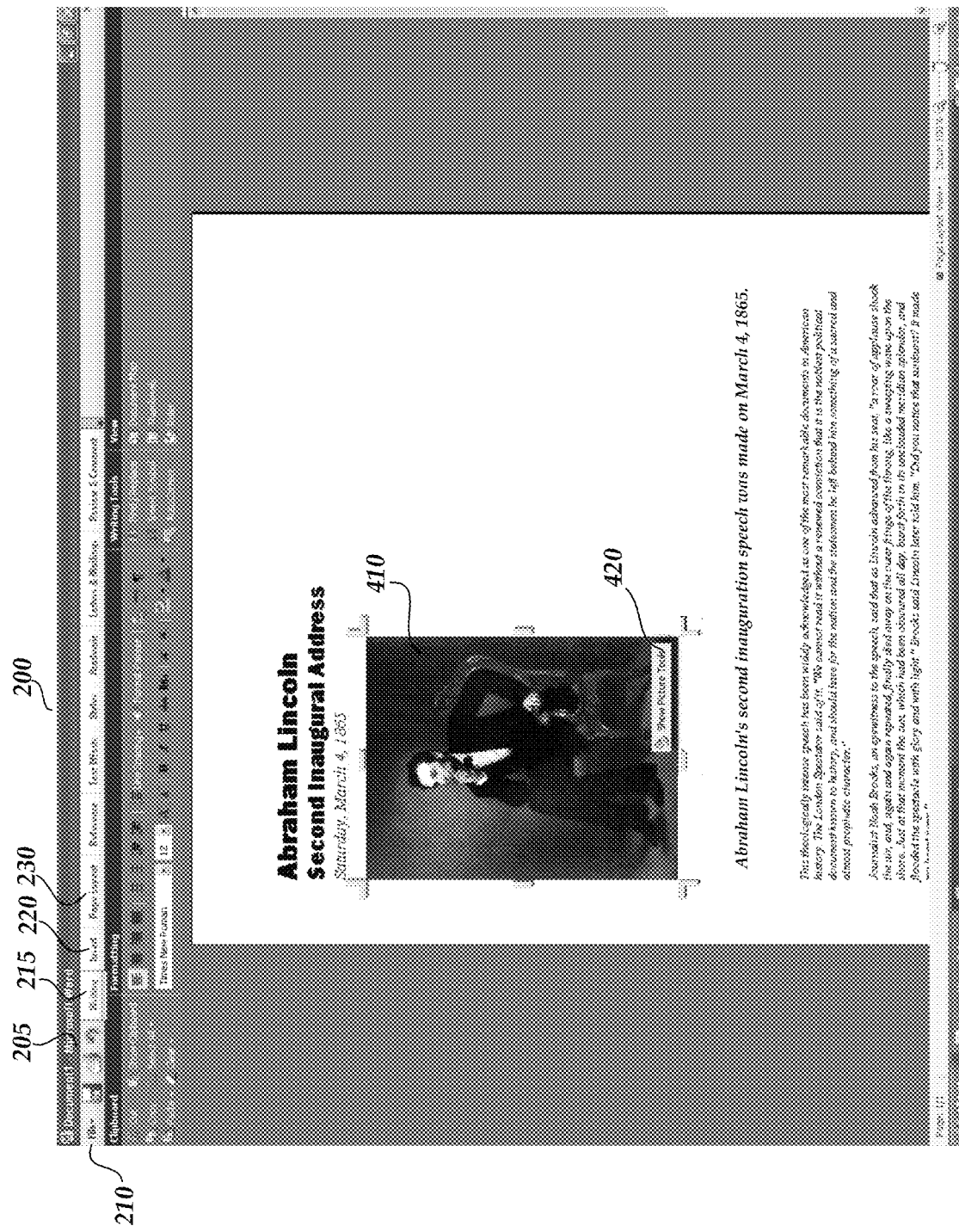
FIG. 4 illustrates a computer screen display showing an editable object according to embodiments of the present invention.

Referring now to FIG. 4, an example text document is displayed in a word processing application workspace having an embedded picture object. The user interface 200, disposed along the upper edge of the word processing application workspace, is displayed with task-based tabs and associated selectable functionality control sections for writing text into the displayed document. If the user desires to edit the picture object 410, according to embodiments of the present invention, the user need not search for functionality required for editing picture objects. Upon selecting the picture object 410 for editing, a "Show Picture Tools" control 420 is displayed to the user for allowing the user to call up tools and other functionality available to the user for editing the selected object. As should be understood by those skilled in the art, the description of the editing of a picture object is for purposes of example only and is not limiting of a variety of different tools and functionalities that may be exposed to the user in a user interface 300 described above upon selection of different types of objects. For example, tools and functionality may be provided for editing table objects, spreadsheet objects, slide presentation objects, database objects, and the like.

Figure 5:
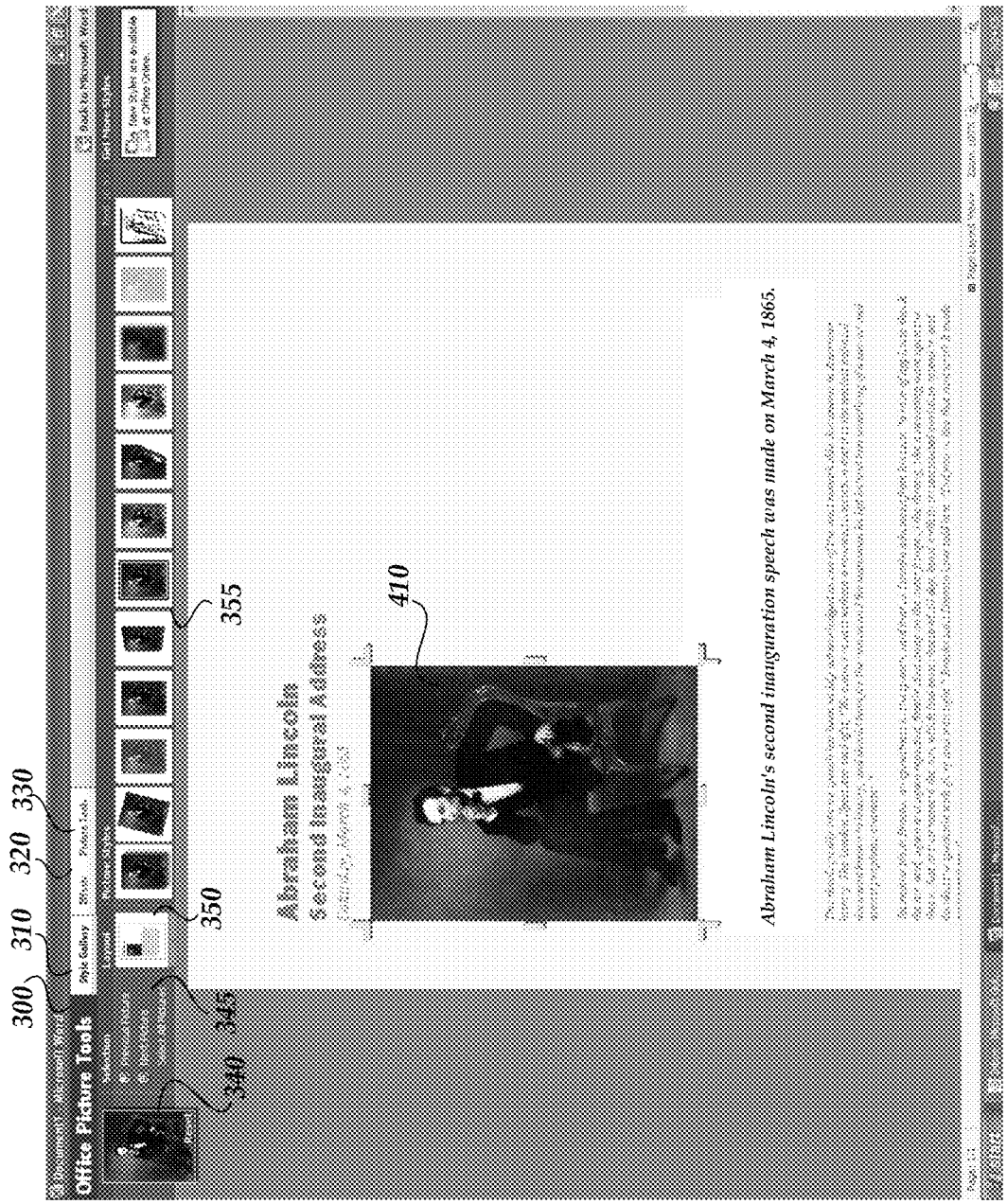
FIG. 5 illustrates a computer screen display showing the presentation of a plurality of functionalities associated with a selected object for editing.

If the user selects the "Show Pictures Tools" control, according to the embodiment illustrated in FIGS. 3-10, the user interface 300 is dynamically generated and temporarily replaces the user interface 200, as illustrated in FIG. 5. Referring to FIG. 5, the user interface 300 replaces the user interface 200, and task-based functionality available to the user for editing the selected picture object is displayed in the user interface 300, as described above with reference to FIG. 3. Now, the user may select one or more functionalities applicable to editing the selected object (e.g., picture object) without the need for searching through a variety of different menus or tool bars for functionality needed for editing the selected object. In order to dismiss the user interface 300 and return to the user interface 200, an exit control may be selected.

Figure 6:
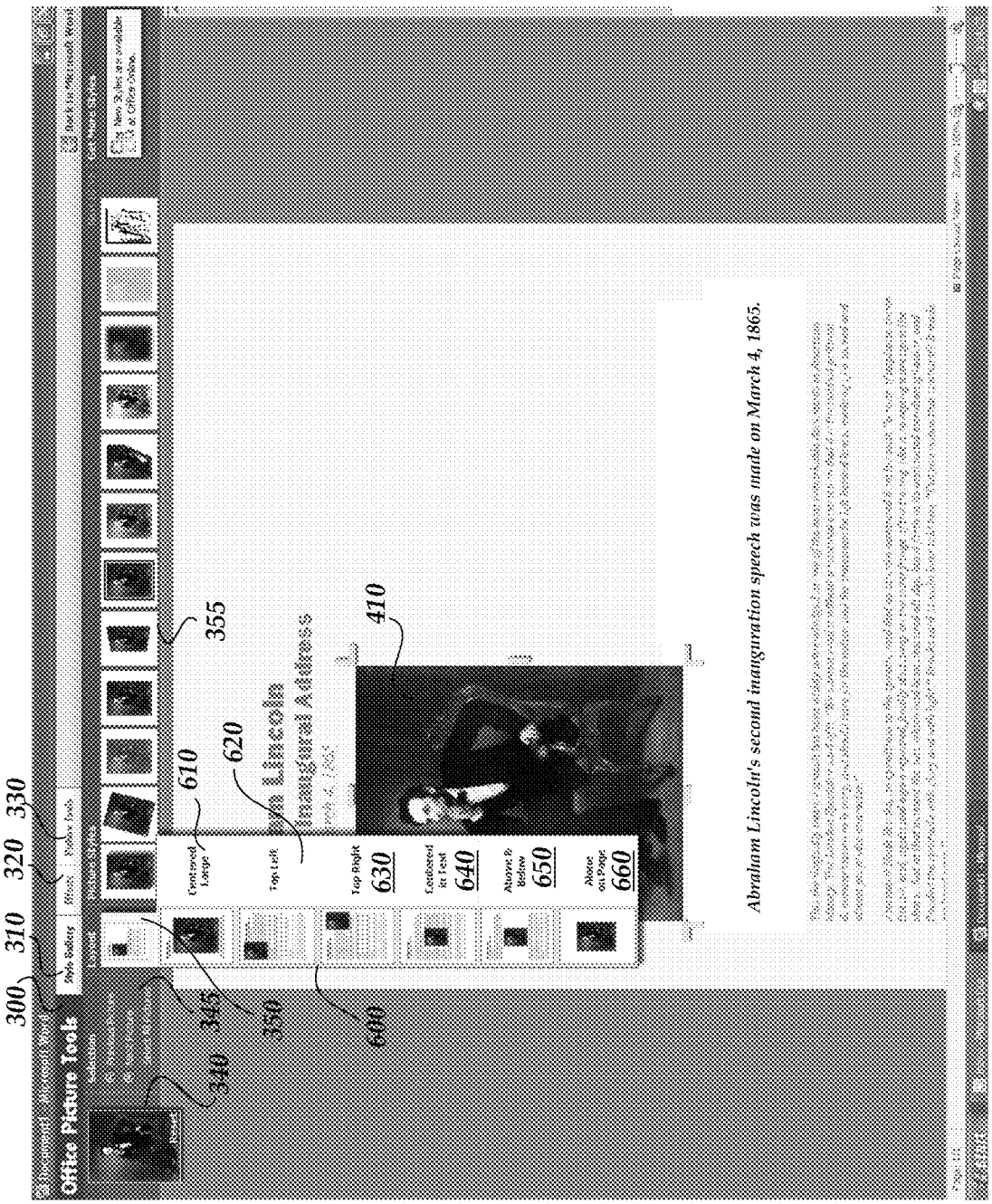
FIG. 6 illustrates the computer screen display of FIG. 5 wherein a drop-down menu of selectable formatting options combinations is illustrated under a selectable formatting control.

Referring to FIG. 6, consider, for example, that the user decides to change the layout of the document by moving the embedded picture object to a different location. The user could manually move the embedded object to a different location followed by changing the orientation and location of text contained in the document to cause the overall document to have an acceptable and desirable layout. However, according to embodiments of the present invention, the user may select the layout control 350 to deploy a drop-down menu for providing a variety of different potential layouts for the selected object within the selected document. For example, the drop-down menu 600 provides layouts such as "Centered Large," 610, "Top Left," 620, "Top Right," 630, "Centered in Text," 640, "Above & Below," 650 and "Alone on Page" 660. As should be understood, the potential layouts described and illustrated with respect to FIG. 6 are for purposes of example only and are not limiting of a variety of different layouts that may be provided to the user via the user interface 300.

As described above with reference to FIG. 3, according to embodiments of the present invention, all required commands for applying a presented formatting or layout of the selected object may be coded for execution upon selecting one of the formatting or layout images provided in the user interface. Accordingly, if the user desires to select a layout placing the selected picture object in the top right orientation of the selected document, the user may select the "Top Right" layout 630, and all required functionality for rearranging the selected object and document according to the selected layout is applied to the document and object so that the document assumes the selected layout, as illustrated in FIG. 7.

Figure 7:
FIG. 7 illustrates a computer screen display showing the presentation of a plurality of functionalities associated with a selected object for editing.
Figure 8:
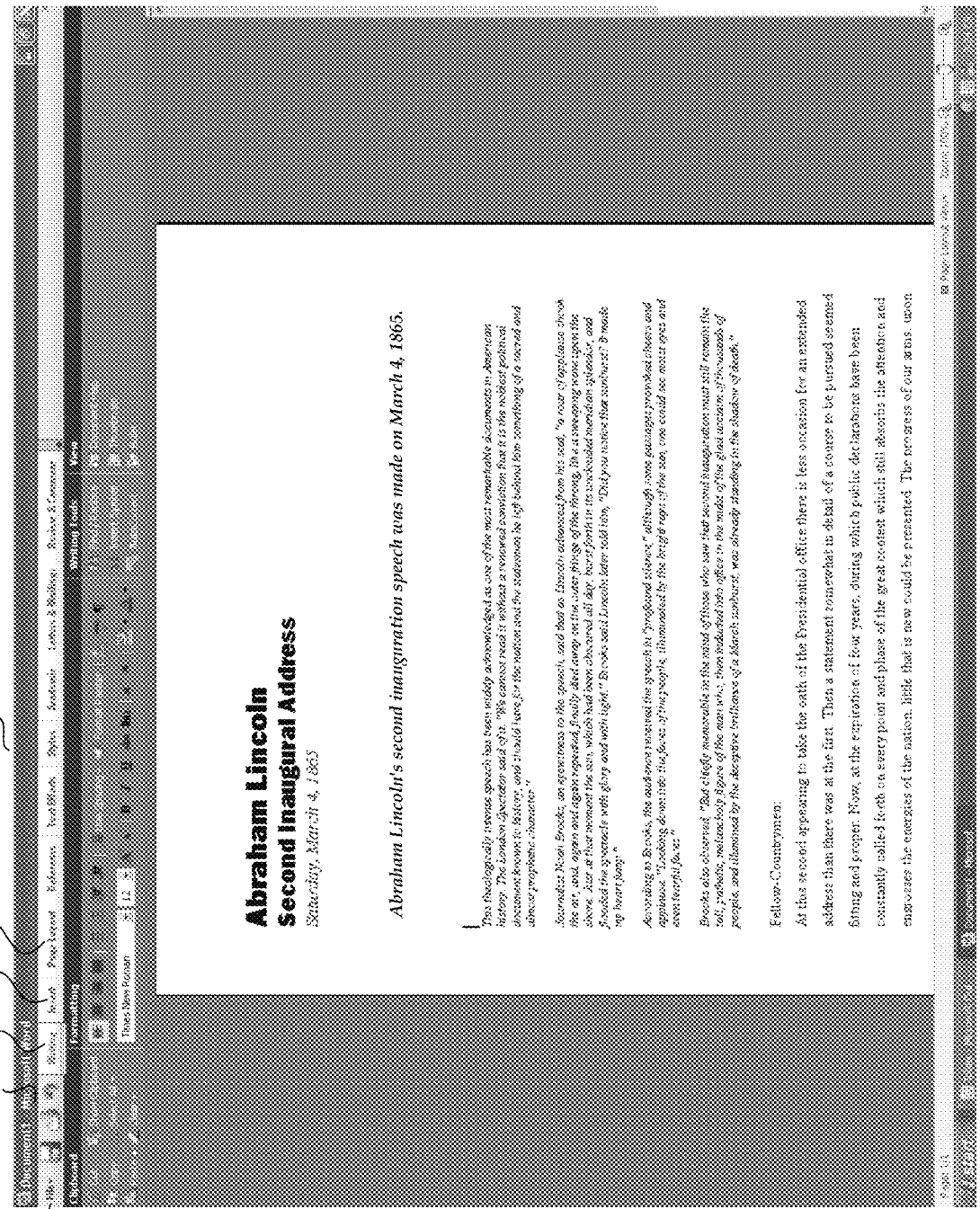
FIG. 8 illustrates a computer screen display showing an editable object according to embodiments of the present invention.

Referring to FIG. 7, the selected object 410 is now positioned in the upper right-hand corner of the document, and the text has been rearranged accordingly. As illustrated in FIG. 7, the user interface 300 containing the functionality associated with the selected object remains persisted in the user interface until the user selects a different object in the document for editing. For example, if the user moves the mouse cursor to a text portion of the document and selects the text portion of the document for editing, the user interface 300 will be dismissed and an appropriate user interface 200 associated with editing the selected text will be displayed, as illustrated in FIG. 4. For example, as illustrated in FIG. 8, the picture object has been deleted and the cursor is situated in the text portion of the document. Accordingly, the user interface 300, containing functionality particular to editing a picture object is dismissed, and the user interface 200, containing task-based tabs and associated selectable functionality controls, groupings or sections is displayed for providing the user necessary functionality for editing the text portion of the document.

Figure 9:
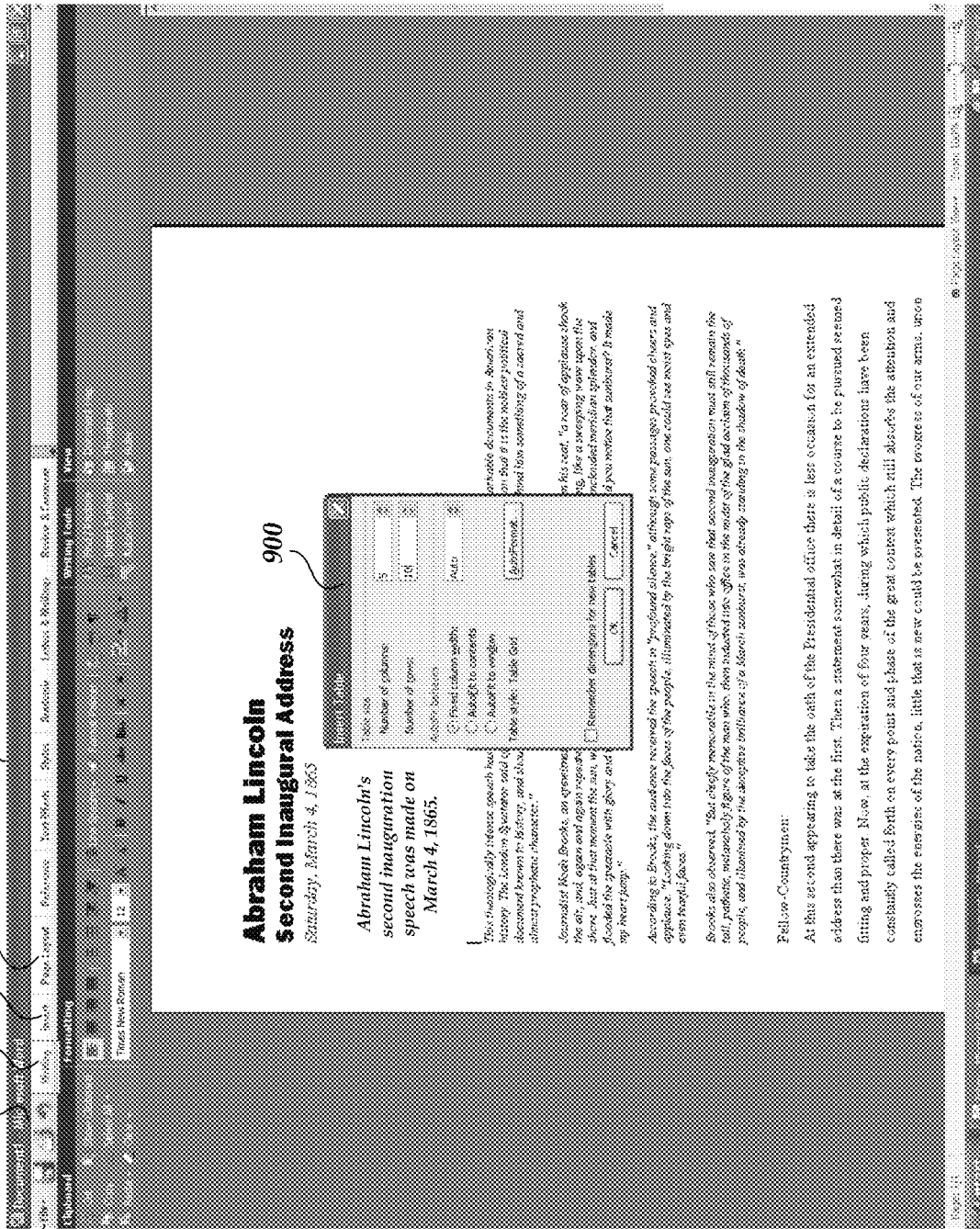
FIG. 9 illustrates a computer screen display showing a pop-up functionality menu for providing functionality associated with a selected object for editing.

As described above, one method for deploying the user interface 300 for providing selectable functionality associated with a particular object is to select a particular object within a given document. Alternatively, the user interface 300, containing functionality associated with a particular object may be deployed by inserting an object of a given type into a document. For example, referring to FIG. 9, if a user decides to insert a table object into the document illustrated in FIG. 9, the user may select the "Insert" task-based tab 220 from the user interface 200 for deploying selectable functionality controls associated with inserting text or objects into the document. If the user then decides to insert a particular object, for example, a table object, into the document, the user may utilize one or more selectable functionality controls presented in the user interface 200, or the user may launch a dialog 900, as illustrated in FIG. 9, for creating and inserting a desired object, for example a table object, into the selected document.

Figure 10:
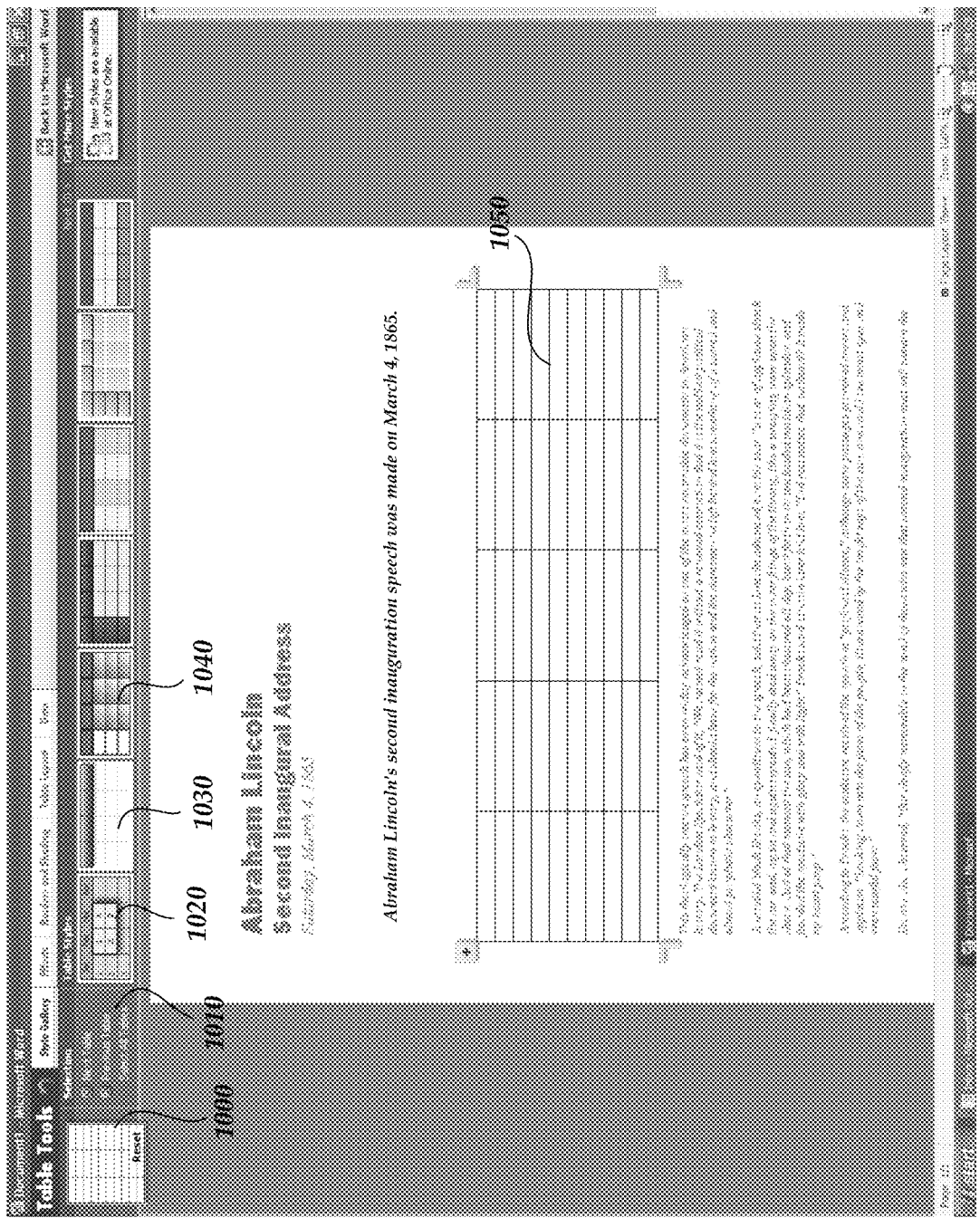
FIG. 10 illustrates a computer screen display showing the presentation of a plurality of functionalities associated with a selected object for editing.

According to embodiments of the present invention, once the user selects for inserting the desired object into the document, the object 1050 is inserted into the document, as illustrated in FIG. 10. Simultaneously, the user interface 200 is replaced with a user interface 300 for displaying selectable functionality for editing the now-selected table object 1050. For example, referring to FIG. 10, the user interface 300 now includes task-based tabs associated with editing a table object. For example, task-based tabs, illustrated in the user interface 300, include "Style Gallery," "Effects," "Borders and Shading," "Table Layout," and "Date." As described above with reference to FIGS. 2 and 3, selection of one of the task-based tabs, for example the "Style Gallery" tab, causes a display of individual or groupings of selectable functionality controls 1020, 1030, 1040 for editing the selected object according to the selected task-based tab.

Figure 11:
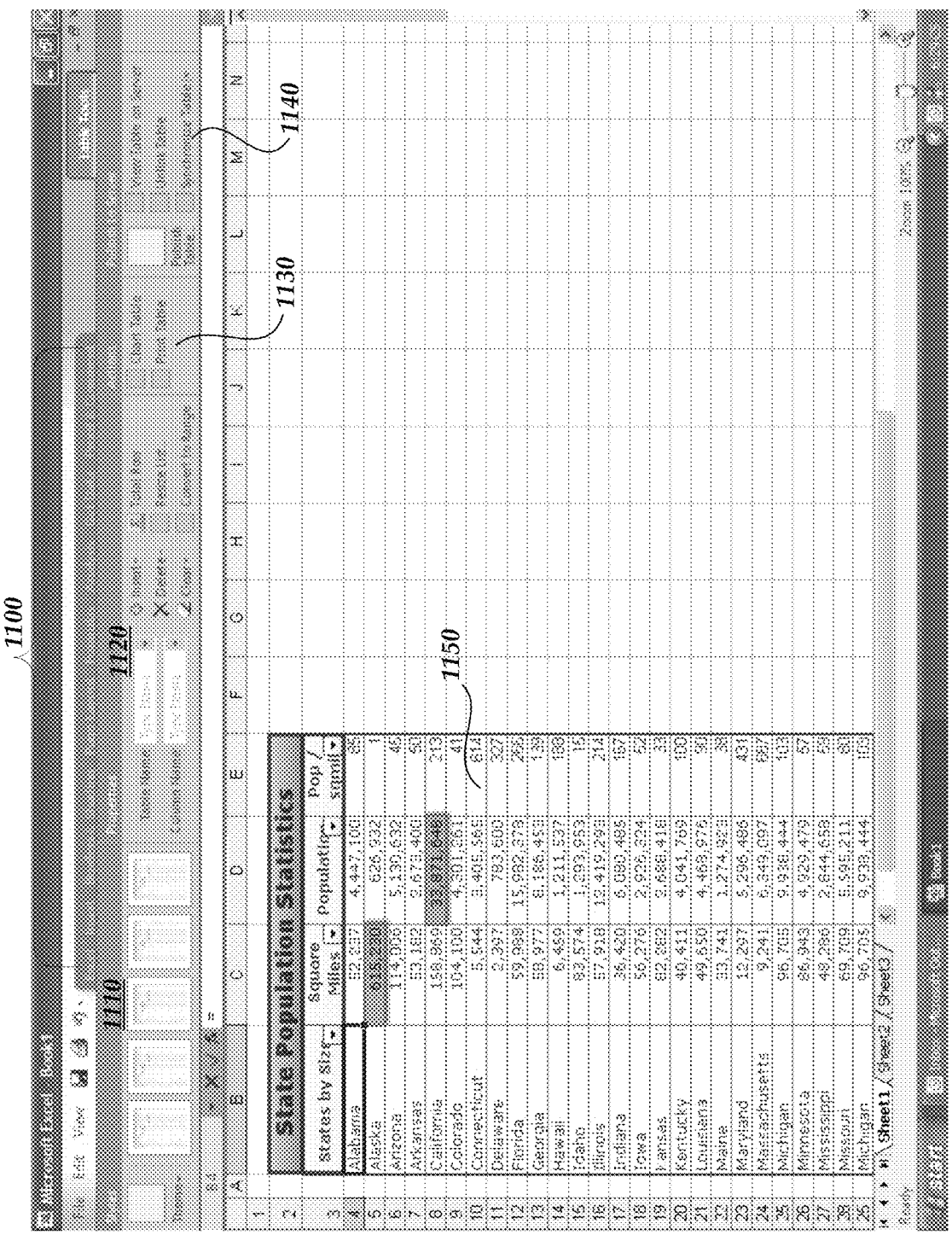
FIG. 11 illustrates a computer screen display showing the presentation of a plurality of functionalities associated with a selected object for editing.

FIGS. 11 through 15 illustrate aspects of an alternate embodiment of the present invention. Referring now to FIG. 11, aspects of this embodiment of the present invention are illustrated and described with reference to a spreadsheet application 140. As illustrated in FIG. 11, a spreadsheet document is displayed having an example table of data 1150. A user interface 1100 similar to the user interface 200 described above with reference to FIG. 2 is disposed above the spreadsheet workspace for providing spreadsheet application functionality. A plurality of task-based tabs are provided at the top of the user interface 1100 for selectively displaying logical groupings of selectable functionality controls associated with given task-based functionality tabs. For example, task-based functionality tabs included in the user interface 1100 include "Insert," "Page Layout," "Analysis," etc.

According to aspects of this embodiment, when an object is selected for editing, such as the table object 1150 illustrated in FIG. 11, the selectable functionality controls associated with the selected object do not replace the tabs displayed in the user interface 1100, but are appended to the user interface 1100 beneath the tabs displayed in the user interface 1100. The controls associated with the selected object are automatically displayed in the appended orientation relative to the tabs of the user interface 1100 upon selection or insertion of a given object. Selection of any of the tabs in the user interface 1100 dismisses the controls displayed for the selected or inserted object that are appended beneath the user interface 1100. For example, a "Styles" section 1110 is provided for applying spreadsheet workspace styles to the document, a "Properties" section 1120 is provided, an "Actions" section 1130 is provided, and a "Publish to Server" section 1140 is provided. According to embodiments of the present invention, because a table object is embedded in the spreadsheet workspace, a "Table Tools" tab is exposed adjacent to the task-based functionality tabs 1100. As should be appreciated, selection of the "Table Tools" tab may cause a display of selectable functionality controls associated with table objects in the lower portion of the user interface.

Figure 12:
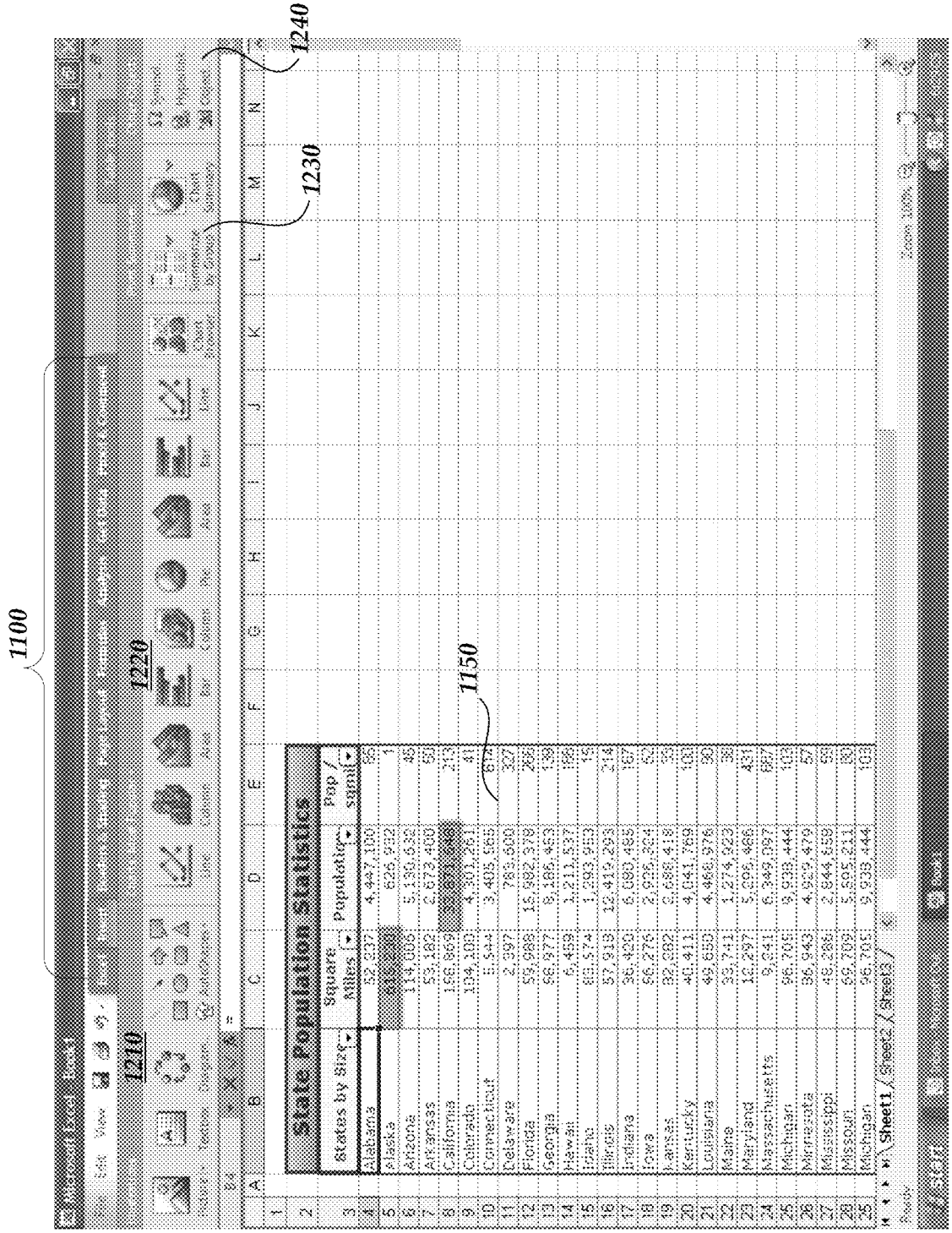
FIG. 12 illustrates a computer screen display showing the presentation of a plurality of functionalities associated with a selected object for editing.

As illustrated in FIG. 12, selection of the "Table Tools" tab causes display of the selectable functionality controls associated with the selected table. Alternatively, the display of the selectable functionality controls associated with the selected table may be automatically displayed upon selection of the table object without use of the "Table Tools" tab. As should be understood, description of the table object 1150 and use of the "Table Tools" tab are for purposes of example only and are not limiting of operation of embodiments of the present invention with respect to other objects that may be inserted into or edited in the spreadsheet workspace.

Figure 13:
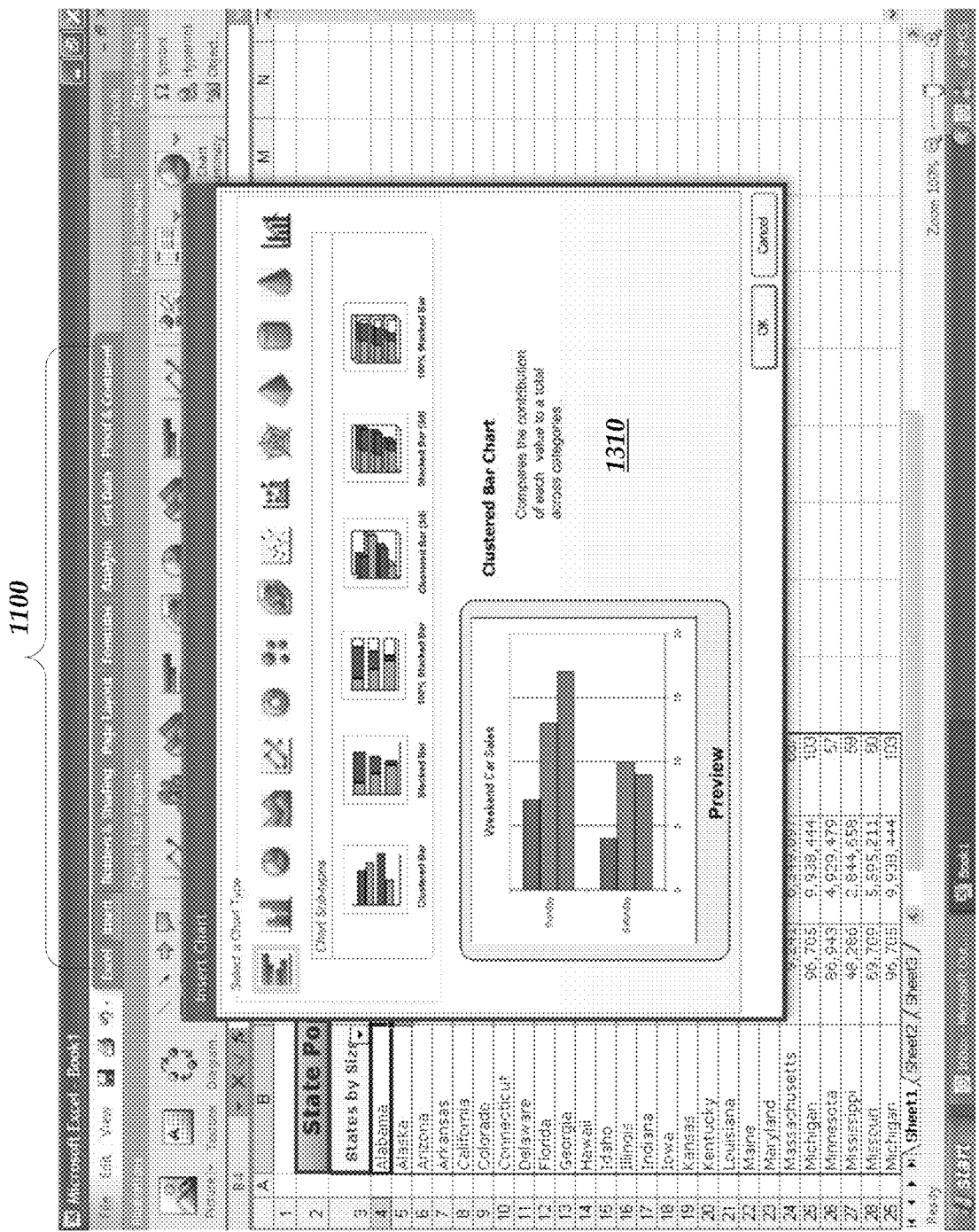
FIG. 13 illustrates a computer screen display showing a pop-up functionality menu for providing functionality associated with a selected object for editing.
Figure 14:
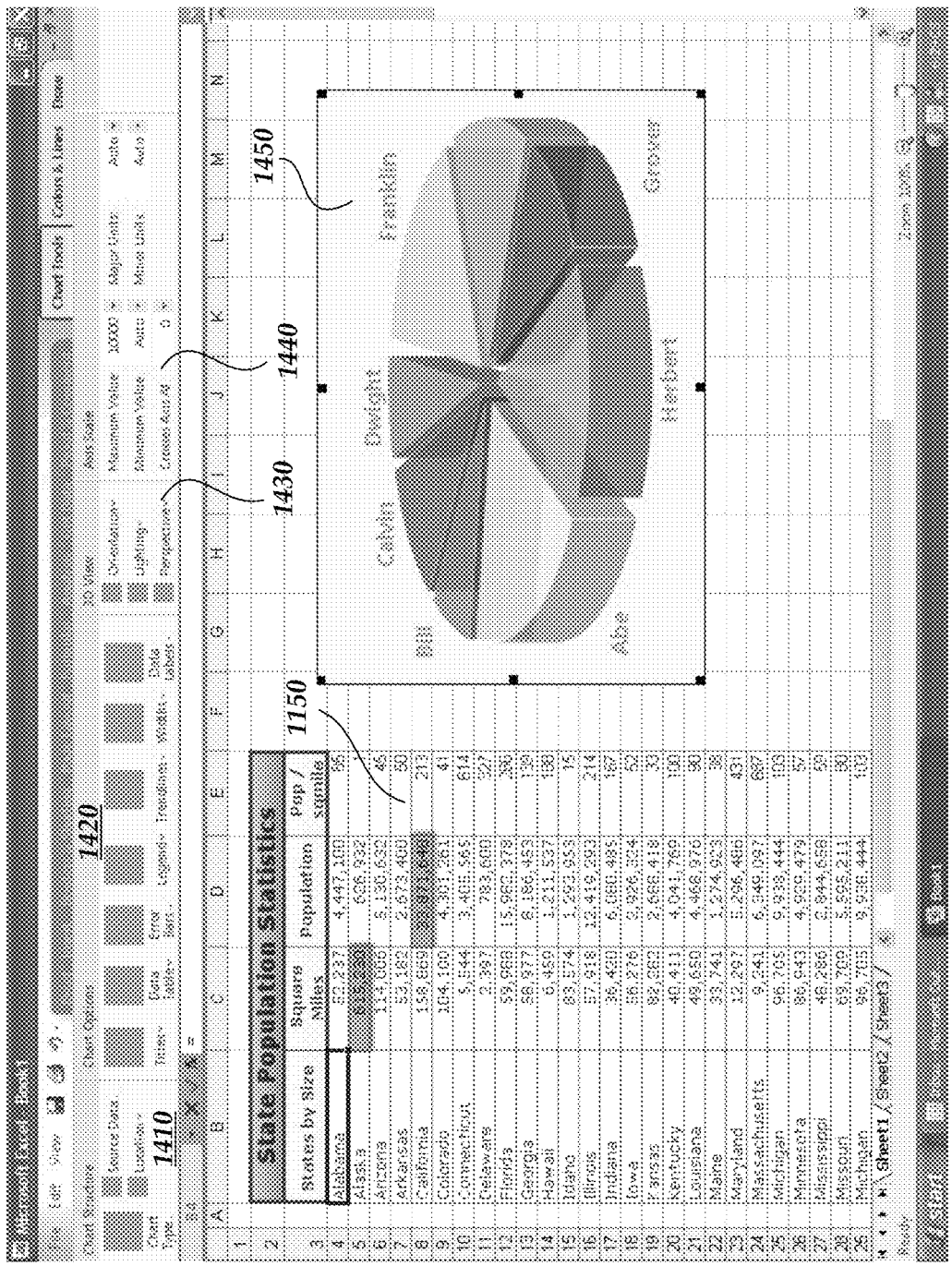
FIG. 14 illustrates a computer screen display showing the presentation of a plurality of functionalities associated with a selected object for editing.

Referring to FIG. 13, if a user decides to create a chart, for example, using data contained in the selected table object, the user may select one of the chart-type images "Controls" illustrated in the user interface of FIG. 12. Upon selection of a chart for inserting into the spreadsheet workspace, an "Insert Chart" dialog 1310 may be displayed for allowing the user to specify attributes of the selected chart. As illustrated in FIG. 14, once particular chart attributes are selected, a corresponding chart is drawn and is displayed in the spreadsheet workspace. According to embodiments of the present invention, insertion of the selected chart automatically causes functionality of the previously displayed user interface (see FIGS. 12 and 13) to be replaced with selectable functionality controls associated with editing the selected and inserted chart. For example, a "Chart Structure" section 1410, a "Chart Options" section 1420, a "3D View" section 1430, and an "Axis Scale" section 1440 are displayed in a lower portion of the user interface to provide particular selectable functionality controls associated with editing the selected chart.

Figure 15:
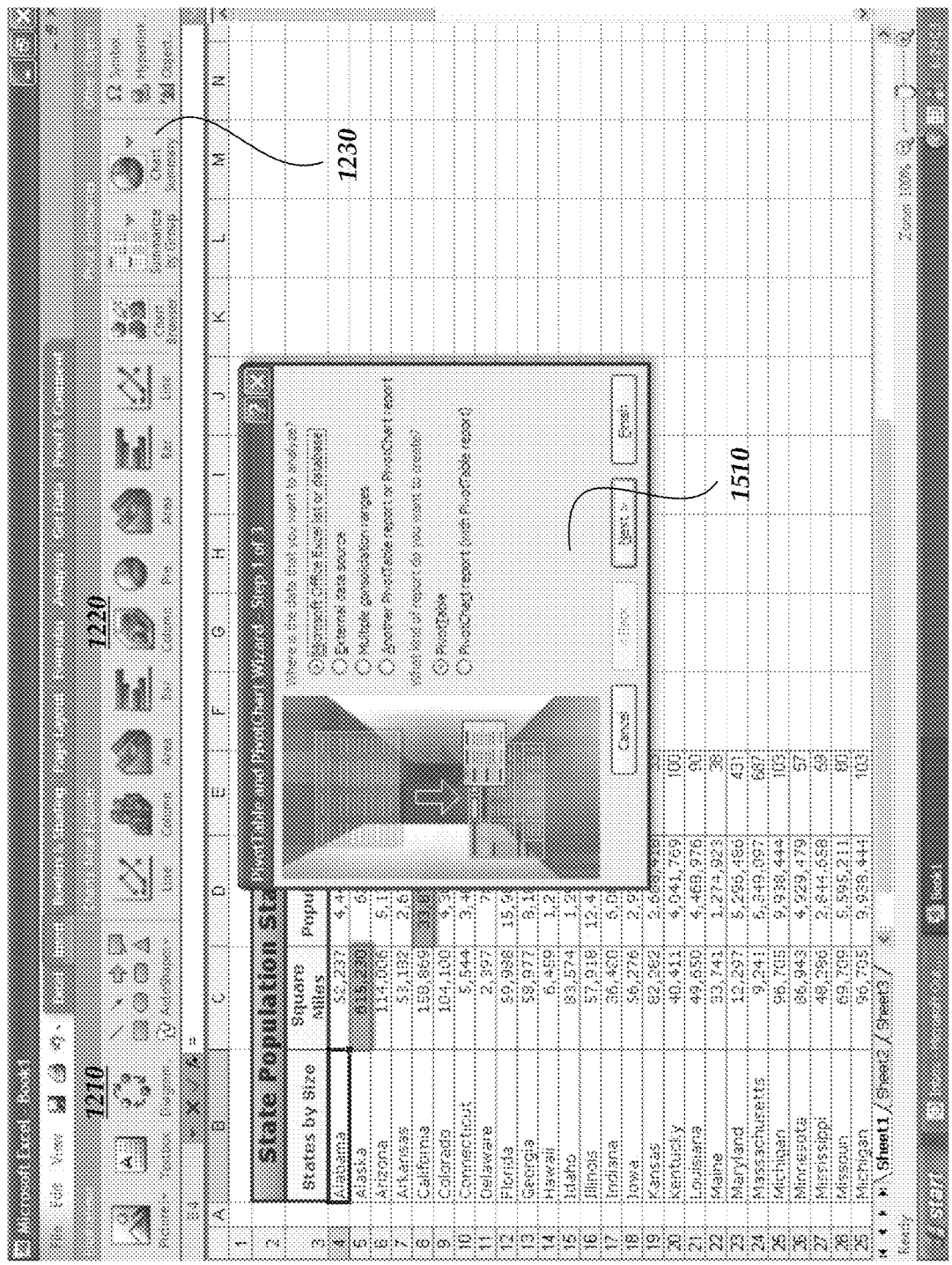
FIG. 15 illustrates a computer screen display showing a pop-up functionality menu for providing functionality associated with a selected object for editing.

Referring now to FIG. 15, if the user selects a different functionality for application to the spreadsheet workspace, for example, inserting a pivot table, the particular functionality displayed in the user interface associated with editing the chart, as illustrated in FIG. 14, is replaced with functionality associated with inserting the selected or desired pivot table. Accordingly, functionality controls are made available and displayed to the user according to the nature of the user's work, for example, selection of a particular object in a document for editing.

As described herein, an improved user interface is provided for displaying selectable functionality controls that are relevant to a selected object and that remain persisted for use while the selected object is being edited. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

What is claimed is:

1. A device-implemented method for providing a user interface, the method comprising:
   causing the display of a plurality of selectable tabs associated with task-based functionality of the software application;
   causing the display of, adjacent to the plurality of selectable tabs, a first selectable control corresponding to a currently selected tab;
   causing the display of, adjacent to the first selectable control, a section for editing an electronic document;
   receiving at least one of: an insertion of an object into the electronic document or a selection of an object in the electronic document; and
   in response to receiving the at least one of the insertion of the object into the electronic document or the selection of the object in the electronic document, causing the display of a first additional selectable tab adjacent to the plurality of selectable tabs.

2. The device-implemented method of claim 1, wherein the object is at least one of an image, a table, or a chart.

3. The device-implemented method of claim 1, further comprising, in response to receiving the at least one of the insertion of the object into the electronic document or the selection of the object in the electronic document, replacing the selectable control with a second selectable control corresponding to the first additional selectable tab.

4. The device-implemented method of claim 1, further comprising:
   receiving a selection of the first additional selectable tab; and
   based on receiving the selection of the first additional selectable tab, replacing the first selectable control with a second selectable control corresponding to the first additional selectable tab.

5. The device-implemented method of claim 1, further comprising, in response to receiving the at least one of the insertion of the object into the electronic document or the selection of the object in the electronic document, causing the display of a second additional selectable tab adjacent to the first additional selectable tab.

6. The device-implemented method of claim 1, further comprising, in response to receiving the at least one of the insertion of the object into the electronic document or the selection of the object in the electronic document, causing the display of a second selectable control, corresponding to the first additional selectable tab, concurrently and adjacent to the first selectable control.

7. The device-implemented method of claim 1, further comprising:
   receiving a selection of the first additional selectable tab; and
   based on receiving the selection of the first additional selectable tab, causing the display of a second selectable control, corresponding to the first additional selectable tab, concurrently and adjacent to the first selectable control.

8. The device-implemented method of claim 1, wherein the electronic document is one of: a spreadsheet document, a word-processing document, or a slide presentation document.

9. A system for providing a user interface for a software application including:
   at least one processor; and
   memory storing instructions that when executed by the at least one processor perform a set of operations, the set of operations comprising:
      generating, for display, a plurality of selectable tabs associated with task-based functionality of the software application;
      generating, for display adjacent to the plurality of selectable tabs, a first selectable control corresponding to a currently selected tab;
      generating, for display adjacent to the first selectable control, a section for editing an electronic document;
      receiving an insertion of an object into the electronic document; and
      in response to receiving the insertion of the object into the electronic document, generating, for display adjacent to the plurality of selectable tabs, a first additional selectable tab.

10. The system of claim 9, wherein the object is at least one of an image, a table, or a chart.

11. The system of claim 9, wherein the operations further comprise, in response to receiving the insertion of the object into the electronic document, replacing the first selectable control with a second selectable control corresponding to the first additional selectable tab.

12. The system of claim 9, wherein the operations further comprise:
   receiving a selection of the first additional selectable tab; and
   based on receiving the selection of the first additional selectable tab, replacing the first selectable control with a second selectable control corresponding to the first additional selectable tab.

13. The system of claim 9, wherein the operations further comprise, in response to receiving the insertion of the object into the electronic document, generating, for display adjacent to the first additional selectable tab, a second additional selectable tab.

14. The system of claim 9, wherein the operations further comprise, in response to receiving the insertion of the object into the electronic document, generating, for display concurrently and adjacent to the first selectable control, a second selectable control corresponding to the first additional selectable tab.

15. The system of claim 9, wherein the operations further comprise:
   receiving a selection of the first additional selectable tab; and
   based on receiving the selection of the first additional selectable tab, generating, for display concurrently and adjacent to the first selectable control, a second selectable control corresponding to the first additional selectable tab.

16. A device-implemented method for providing a user interface for a software application, the method comprising:
   generating, for display, a plurality of selectable tabs associated with task-based functionality of the software application;
   generating, for display, adjacent to the plurality of selectable tabs, a first selectable control corresponding to a currently selected tab;
   generating, for display, adjacent to the first selectable control, a section for editing an electronic document;
   receiving a selection of an object in the electronic document; and
   in response to receiving the selection of the object into the electronic document, generating, for display adjacent to the plurality of selectable tabs, a first additional selectable tab.

17. The device-implemented method of claim 16, further comprising, in response to receiving the selection of the object, replacing the first selectable control with a second selectable control corresponding to the first additional selectable tab.

18. The device-implemented method of claim 16, further comprising:
   receiving a selection of the first additional selectable tab; and
   based on receiving the selection of the first additional selectable tab, replacing the first selectable control with a second selectable control corresponding to the first additional selectable tab.

19. The device-implemented method of claim 16, further comprising, in response to receiving the selection of the object, generating, for display adjacent to the first additional selectable tab, a second additional selectable tab.

20. The device-implemented method of claim 16, further comprising, in response to receiving the selection of the object, generating, for display concurrently and adjacent to the first selectable control, a second selectable control corresponding to the first additional selectable tab.

* * * * *